(12) United States Patent
Paetow et al.

(10) Patent No.: US 8,733,040 B2
(45) Date of Patent: May 27, 2014

(54) DEVICE FOR SHUTTERING AN OPENING IN A CONSTRUCTIONAL COMPONENT

(75) Inventors: Mario Paetow, Igling (DE); Sabine Heimerl, Schwabmuenchen (DE)

(73) Assignee: Hilti Aktiengesellschaft, Schaan (LI)

( * ) Notice: Subject to any disclaimer, the term of this patent is extended or adjusted under 35 U.S.C. 154(b) by 960 days.

(21) Appl. No.: 12/152,876

(22) Filed: May 15, 2008

(65) Prior Publication Data

US 2008/0282639 A1 Nov. 20, 2008

(30) Foreign Application Priority Data

May 16, 2007 (DE) .......................... 10 2007 000 278

(51) Int. Cl.
*E06B 3/28* (2006.01)

(52) U.S. Cl.
USPC .............................................. 52/203; 52/514

(58) Field of Classification Search
USPC ................................... 52/202, 203, 514, 656.7
See application file for complete search history.

(56) References Cited

U.S. PATENT DOCUMENTS

| | | | | | |
|---|---|---|---|---|---|
| 3,373,467 | A | * | 3/1968 | Loughrey | 425/12 |
| 5,685,112 | A | * | 11/1997 | Fara | 52/202 |
| 6,155,009 | A | * | 12/2000 | Pena | 52/202 |
| 6,161,605 | A | * | 12/2000 | Pena | 160/90 |
| 6,330,768 | B1 | * | 12/2001 | Rodrigues | 52/202 |
| 6,634,146 | B2 | * | 10/2003 | Carlson | 52/204.55 |
| 2007/0107329 | A1 | * | 5/2007 | Ferrara | 52/203 |

FOREIGN PATENT DOCUMENTS

DE 27 32 393 2/1979

* cited by examiner

*Primary Examiner* — Branon Painter
(74) *Attorney, Agent, or Firm* — Abelman, Frayne & Schwab

(57) ABSTRACT

A device for shuttering an opening (31) in a constructional component (30), includes at least one sheeting element (11) at least one attachment element for securing the sheeting element on the constructional component (30) and having at least one expansion band (13, 14) securable to the sheeting element (11) and a locking element (15), and a complementary locking element (17) extendable through the through-opening in the locking element (15), with a distance between the locking element (17) and the sheeting element (11) along the complementary locking element (17) being reduceable.

7 Claims, 3 Drawing Sheets

DEVICE FOR SHUTTERING AN OPENING IN A CONSTRUCTIONAL COMPONENT

BACKGROUND OF THE INVENTION

1. Field of the Invention

The present invention relates to a device for shuttering an opening in a constructional component and including at least one sheeting element and at least one attachment element securable on the sheeting element for securing the sheeting element on the constructional component.

2. Description of the Prior Art

Devices of the type described above serve for covering or closing openings, which are provided in constructional components, such as walls, ceilings, on one side before these openings are filled from the opposite side with mineral constructional materials or masses.

For mounting the device on a constructional component for closing an opening therein, e.g., a sheeting plate such as, e.g., a stop end is secured on a first side of the opening with a plurality of dowels and screws which are screwed into respective dowels. To this end, firstly, sidewise of the opening, a plurality of bores for receiving the dowels are formed in the constructional component, with corresponding holes being formed in the sheeting plate. Then the sheeting plate can be secured, e.g., with screws extendable into the holes of respective dowels. This type of attachment is very expensive.

The above-described attachment of a sheeting plate to a constructional component with a dowel and a screw is disclosed in German Publication DE 2 732 393 A1. Firstly, a dowel is set in the constructional component and then, a screw is screwed through a hole in the sheeting plate and into the dowel in order to secure the sheeting plate.

If a plate such as, e.g., a sheeting plate is used for shuttering an opening in a constructional component, then, also, sidewise of the opening, at least one bore for a dowel should be formed. This is time-consuming and expensive.

Accordingly, an object of the present invention is a device for shuttering an opening in a constructional component in which the above discussed drawbacks are eliminated, and a simple and quick mounting of a sheeting element on a constructional component becomes possible.

SUMMARY OF THE INVENTION

This and other objects of the present invention, which will become apparent hereinafter, are achieved, by providing a shuttering device of the type described above in which the attachment element has at least one expansion band securable to the sheeting element, and a locking element spaced from the sheeting element and having a through-opening and the device further includes a complementary locking element extendable through the through-opening in the locking element, with a distance between the locking element and the sheeting element along the complementary locking element being reduceable for expanding the expansion band to secure the sheeting element on the constructional component.

With the inventive shuttering device, the expansion band expands outwardly upon reduction of the distance between the locking element and the sheeting element, toward the inner wall of the opening, with the device being secured on the constructional component frictionally or forcelockingly. The fixation or securing of the device can advantageously take place at a side of the opening remote from the sheeting element.

Advantageously, the at least one expansion band has projecting elements provided on at least one flat surface. The projecting elements increase, during mounting of the device on the opening, the holding forces of the expansion band against the inner wall of the opening.

Advantageously, the projecting elements are formed as teeth of a toothing which can formlockingly engage from behind the unevennesses of the inner wall.

From the manufacturing point of view, it is advantageous when the at least one expansion band is formed integrally with the locking member as a one-piece element.

Constructively, it is advantageous when the locking element is provided at an end of the expansion band remote from the sheeting element.

It is further advantageous when the attachment element includes one or more further expansion bands connectable with each other and the at least one expansion band by the locking element.

It is further advantageous when the sheeting element has first and second parts connectable with each other along a foldable support for folding movement relative to each other. Thereby, it is possible to diminish the sheeting element by folding it and insert it through the opening in a constructional component Thereby mounting of the device can take place from a side of the opening lying opposite the shuttered side of the opening.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
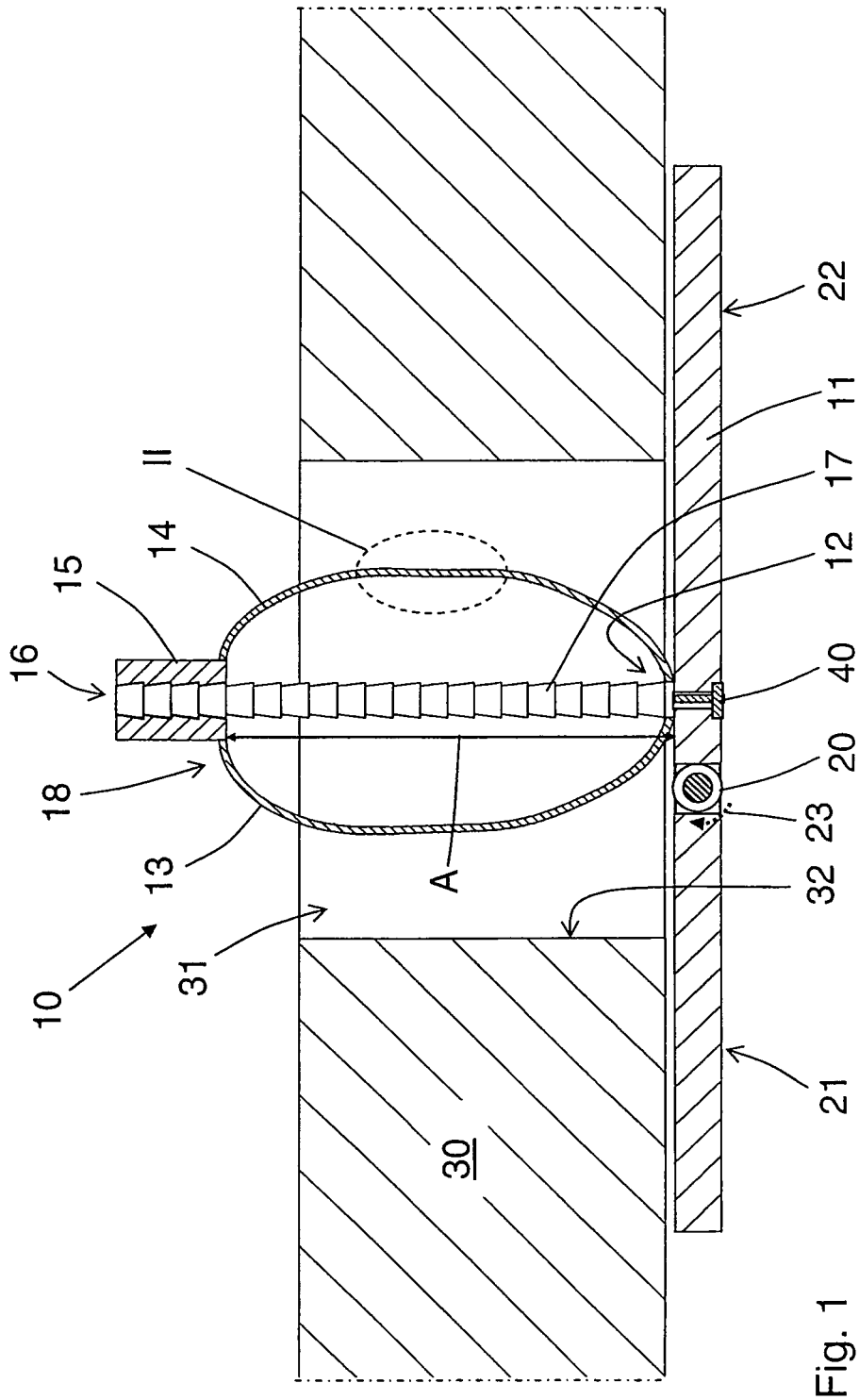
FIG. 1 a longitudinal cross-sectional view of a device for shuttering an opening in a constructional component according to the present invention and mounted on an opening.
Figure 2:
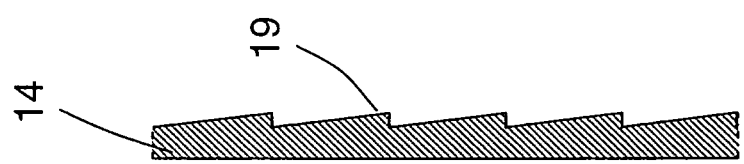
FIG. 2 a cross-sectional view of a detail II of a expansion band of the device shown in FIG. 1.
Figure 3:
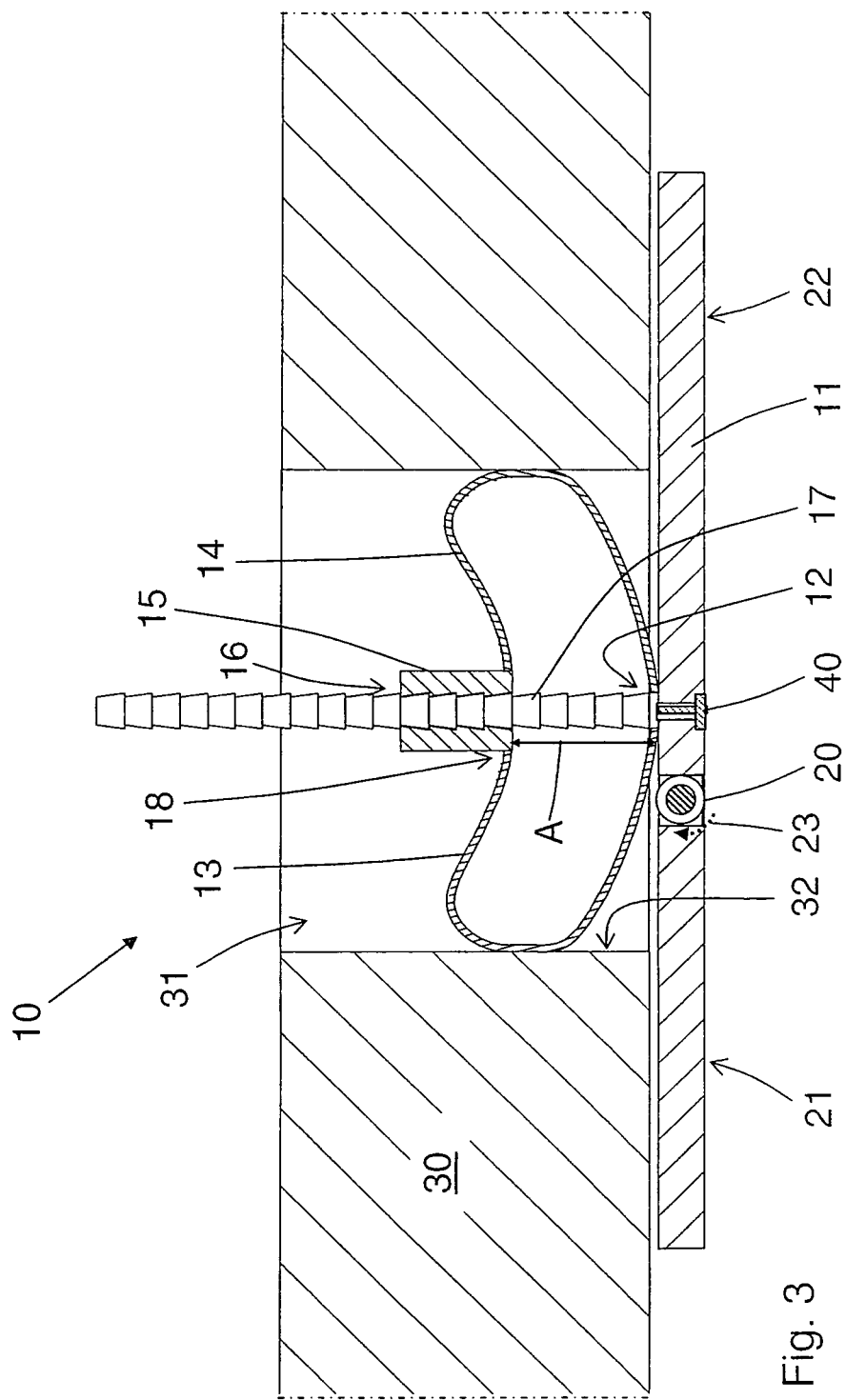
FIG. 3 a longitudinal cross-sectional view of the device shown in FIG. 1 in a secured on the opening condition.

A device according to the present invention for shuttering an opening 31 in a constructional component 30, which is shown in FIGS. 1-3, includes a plate-shaped sheeting element 11 and two expansion bands 13, 14 which are secured on the sheeting element 11. The expansion bands 13, 14 have each at least one surface formed by a plurality of projecting elements 19, e.g., by teeth or toothing, provided on a flat side of the expansion band (see FIG. 2). A locking element 15, which connects the two expansion bands 13, 14 with each other, is provided at the first ends 18 of the expansion bands 13, 14 remote from the sheeting element 11. The locking element 15 has a through-opening 16 having locking means for engaging a complementary locking element 17. The complementary locking element 17 can, e.g., be provided with teeth that cooperate with the locking means provided in the through-opening 16. The complementary locking element 17 and the expansion bands 13, 14 are connected with each other at a second end 12 opposite the first end 18 at which the locking element 15 is provided, and are advantageously formed as a one-piece part, preferably, as a plastic part. The expansion bands 13, 14 and the complementary locking element 17 are secured to the sheeting element 11 at the second end 12. The securing of the expansion bands 13, 14 and of the complementary locking element 17 on the sheeting element 11 can be effected, e.g., with a fastening element 40 or, e.g., with glue.

The sheeting element 11 is formed of two parts and has a first part 21 and a second part 22 which are connected with each other by a foldable support 20. The first part 21 is pivotable relative to the second part 22 in direction of arrow 23. Thereby, the sheeting element 11 can be made smaller in order to be able to displace it through the opening 31 in the constructional component 30.

In FIG. 3, the complementary locking element 17 is passed through the through-opening 16 in the locking element 15, whereby the distance A between the sheeting element 11 and the locking element 15 is reduced. Thereby, the expansion bands 13, 14 expand radially outwardly and toward the sheeting element 11, with regard to the projection of the locking element 15. Thereby, the projection elements 19 or the toothing on the expansion bands 13, 14 engage an inner wall 32 of the opening 31, holding the device 10 on the opening 31, with the sheeting element 11 closing the opening 31 in the constructional component 30.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A device for shuttering an opening (31) in a constructional component (30), comprising at least one sheeting element (11) for closing the opening (31); and at least one attachment element securable on the sheeting element (11) for securing the sheeting element on the constructional component (30), the attachment element having at least one expansion band (13, 14) attached to the sheeting element (11) and expandable for securing the sheeting element on the constructional component (30), and a locking element (15) having a through-opening (16) and spaced from the sheeting element (11); and a complementary locking element (17) extending through the through-opening (16) in the locking element (15), the locking element (15) being displaceable along the complementary locking element (17) for reducing a distance between the locking element (15) and the sheeting element (11), whereby the expansion band (13, 14) expands, securing the sheeting element (1) on the constructional component (30).

2. A shuttering device according to claim 1, wherein the at least one expansion band (13, 14) comprises projecting elements (19) provided on at least one flat surface thereof.

3. A shuttering device according to claim 2, wherein the projecting elements (19) are formed as teeth of a toothing.

4. A shuttering device according to claim 1, wherein the at least one expansion band (13, 14) is formed integrally with the locking element (15).

5. A shuttering device according to claim 1, wherein the locking device (15) is provided at an end of the expansion band (13, 14) remote from the sheeting element (11).

6. A shuttering device according to claim 1, wherein the at least one attachment element comprises at least two expansion bands (13, 14) connectable with one another by the locking element (15).

7. A shuttering device according to claim 1, wherein the sheeting element (11) has first and second parts (21, 22) connectable with each other along a foldable support (20) for folding movement relative to each other.

* * * * *